W. A. HICKMAN.
MOTOR BOAT.
APPLICATION FILED MAR. 12, 1914.
1,204,355.
Patented Nov. 7, 1916.
5 SHEETS—SHEET 2.
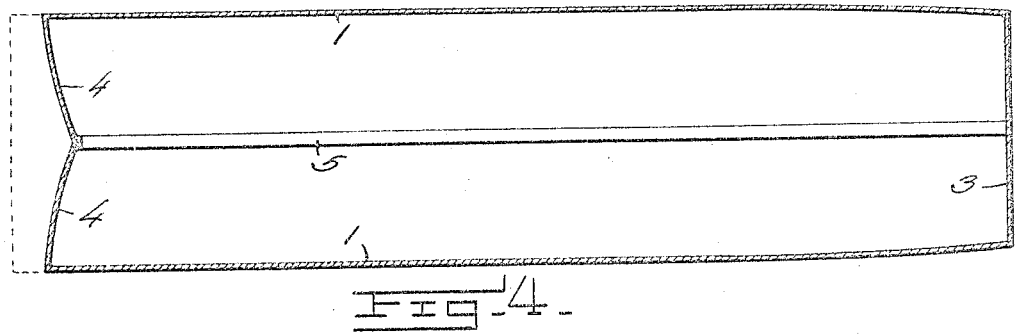
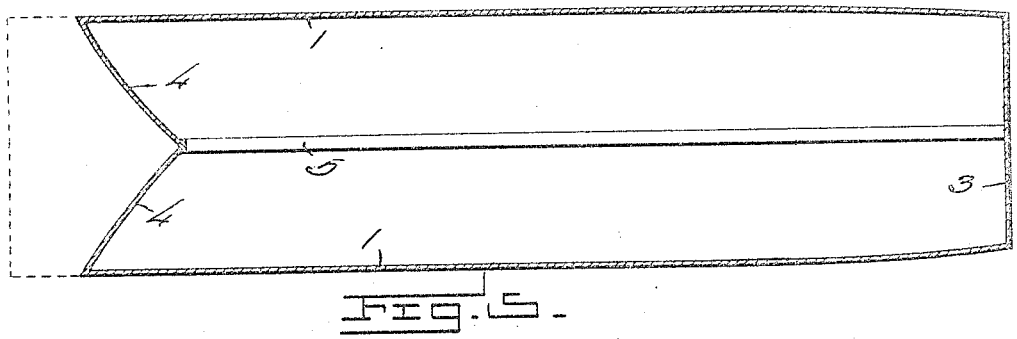
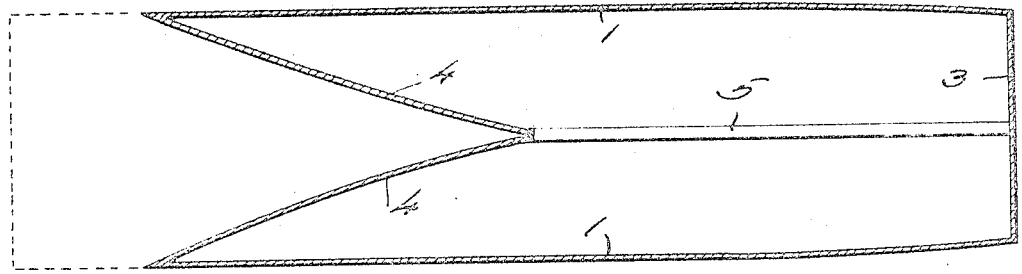
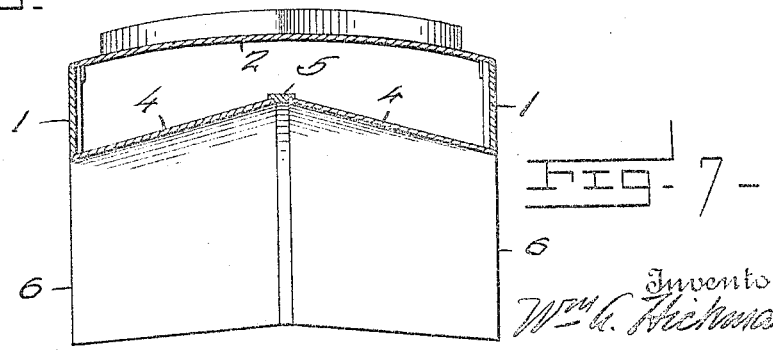

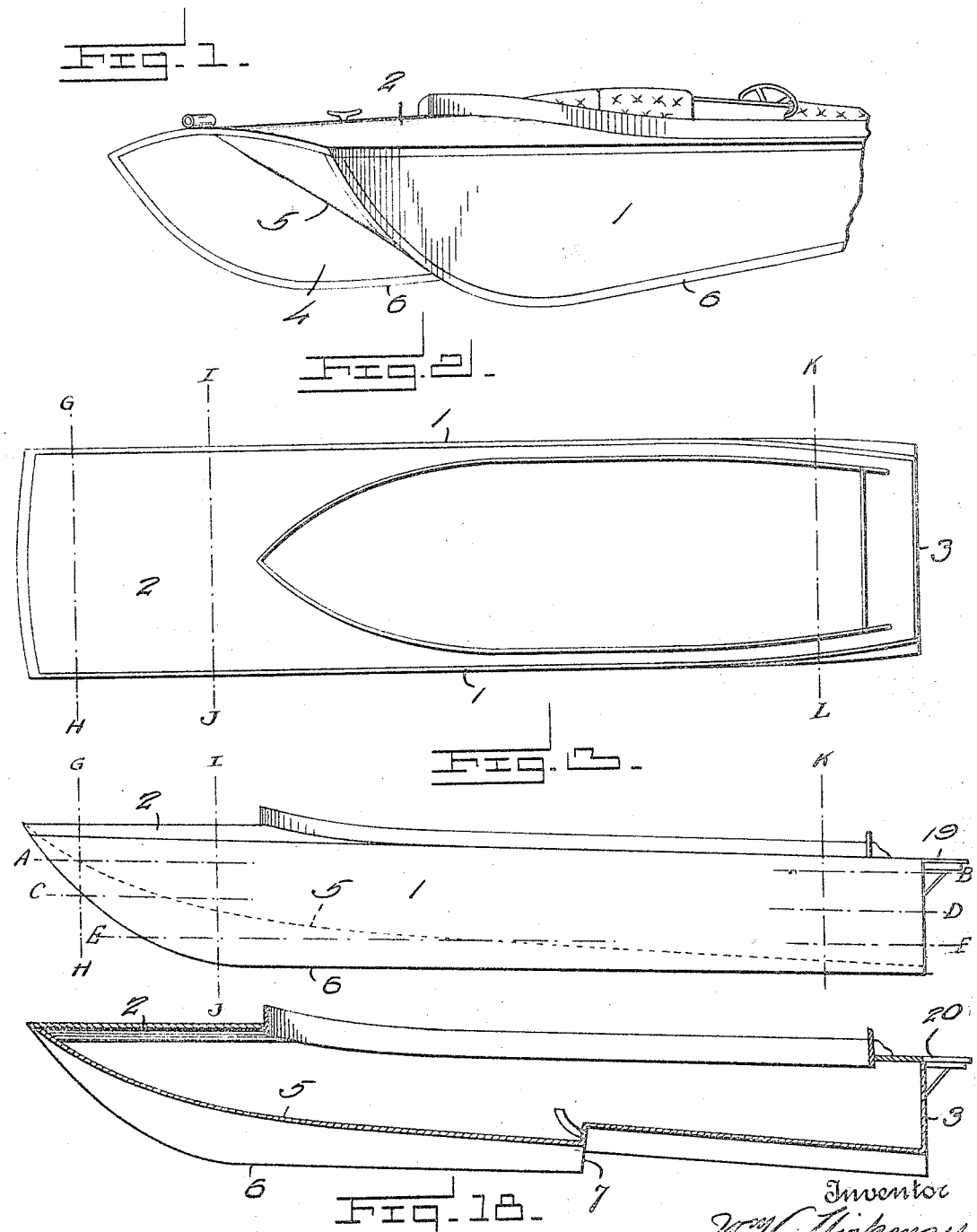

W. A. HICKMAN.
MOTOR BOAT.
APPLICATION FILED MAR. 12, 1914.

1,204,355.

Patented Nov. 7, 1916.
5 SHEETS—SHEET 3.

Witnesses
L. L. Armstrong.
Ed. R. Ludy.

Inventor
W. A. Hickman
By E. J. Fetherstonhaugh
Attorney

W. A. HICKMAN.
MOTOR BOAT.
APPLICATION FILED MAR. 12, 1914.

1,204,355.

Patented Nov. 7, 1916.
5 SHEETS—SHEET 4.

Witnesses
George D. Quilham
[signature]

Inventor.
Wm. A. Hickman

By E. J. Featherstonhaugh
ATTORNEY

UNITED STATES PATENT OFFICE.

WILLIAM ALBERT HICKMAN, OF BOSTON, MASSACHUSETTS.

MOTOR-BOAT.

1,204,355.

Specification of Letters Patent.

Patented Nov. 7, 1916.

Application filed March 12, 1914. Serial No. 824,195.

*To all whom it may concern:*

Be it known that I, WILLIAM ALBERT HICKMAN, a subject of the King of Great Britain, and resident of Copley Plaza, in the city of Boston, State of Massachusetts, one of the United States of America, have invented certain new and useful Improvements in Motor-Boats; and I do hereby declare that the following is a full, clear, and exact description of the same.

The invention relates to improvements in motor boats as described in the present specification and illustrated in the accompanying drawings that form part of the same.

The invention consists essentially in the novel type of hull and in its association with the means of propulsion, and with the means of guiding.

The objects of the invention are to furnish a new means of stabilizing a boat when at speed, either in rough or smooth water, and generally, to improve the seaworthiness; to furnish a novel design of hull which will attain to a planing position, or a position in which the boat can glide upon the surface of the water with greater weight per horsepower than in other types of hydroplane; to lessen the resistance of the boat upon the water over which she travels, and thereby increase the speed per horsepower per pound; to eliminate the pounding of the hull bottom on rough water; to do away with the troubles encountered by speed boats incident to weed growths and driftwood; to facilitate the rapid handling of the boat not only in speed trials, but for purposes of safety; to do away with the inconvenience of flying spray, in rough water, or in wind, independent of the speed at which the boat may be driven; and, generally, to provide a boat simple in construction and adaptable for speed, and ordinary pleasure pursuits.

Figure 8:
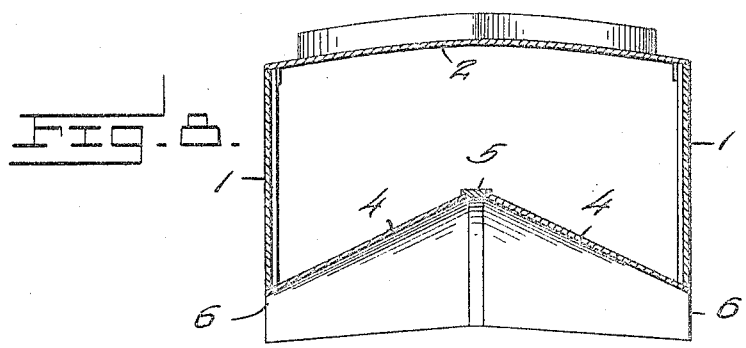
Figure 9:
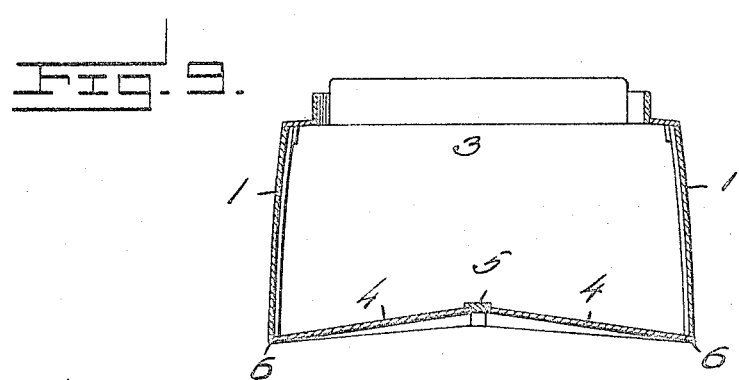
Figure 10:
Figure 11:
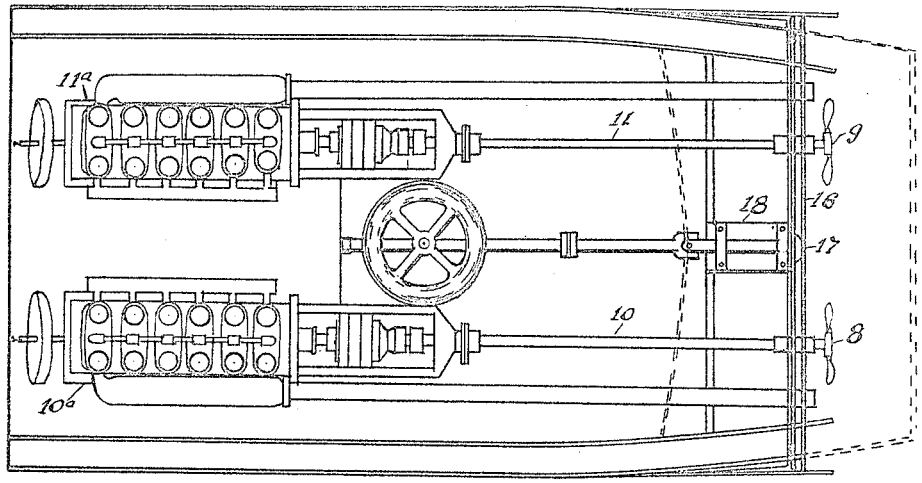
Figure 12:
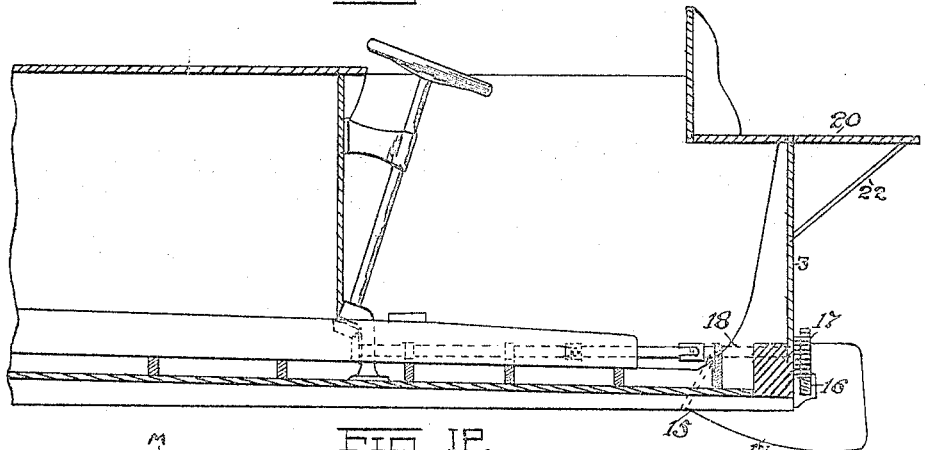
Figure 13:
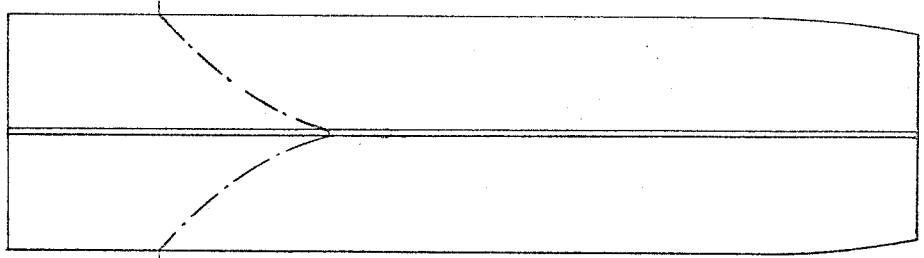
Figure 14:
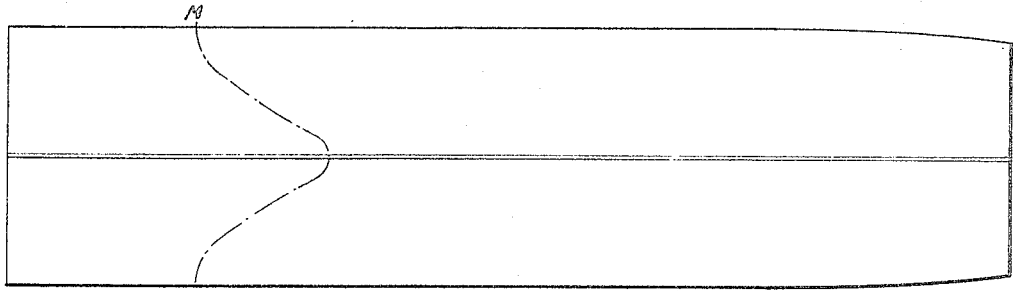
Figure 15:
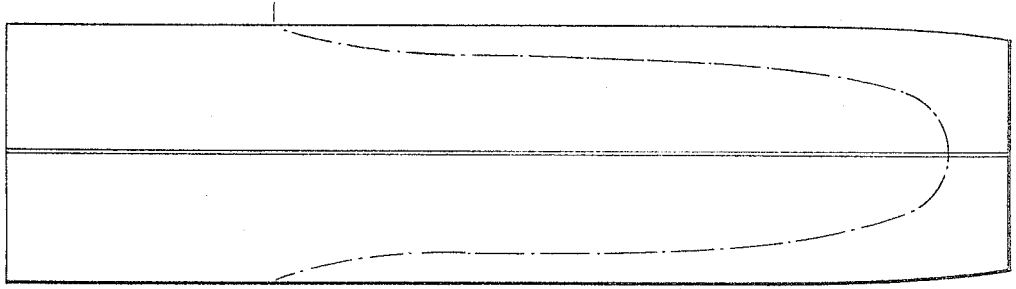
Figure 16:
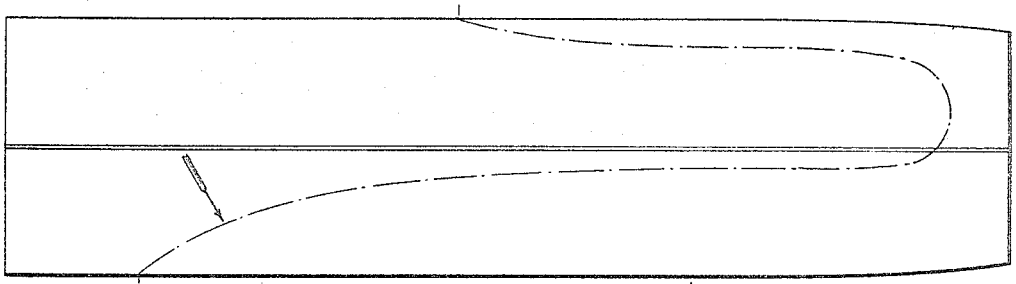
Figure 17:
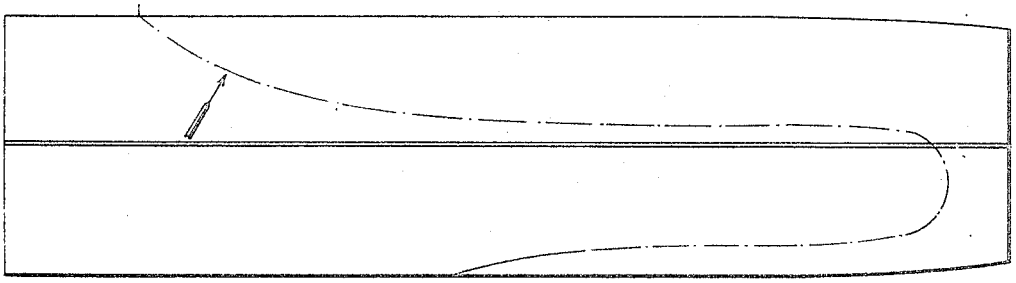

In the drawings, Figure 1 is a perspective view of the major portion of the boat particularly showing the form of the bow. Fig. 2 is a plan view of the hull. Fig. 3 is a side elevation of the hull showing the relative positions of the keel and chine in dotted lines. Fig. 4 is a sectional plan view on the line A—B in Fig. 3. Fig. 5 is a sectional plan view on the line C—D in Fig. 3. Fig. 6 is a sectional plan view on the line E—F in Fig. 3. Fig. 7 is a cross sectional view on the line G—H in Figs. 2 and 3. Fig. 8 is a cross sectional view on the line I—J in Figs. 2 and 3. Fig. 9 is a cross sectional view on the line K—L in Figs. 2 and 3. Fig. 10 is a detail of the stern transom showing the positions of the surface propellers. Fig. 11 is an enlarged plan view of that portion of the boat toward and at the stern, showing the engines, shafts and steering gear. Fig. 12 is a detail showing a side elevation of a rudder and a portion of the side wall of the hull. Fig. 13 is a diagrammatic view showing a water line M—N and the hull at rest. Fig. 14 is a diagrammatic view showing the water line M—N and the hull in the first position after the start before planing. Fig. 15 is a diagrammatic view showing the water line M—N and the hull at speed position bodily raised through planing. Fig. 16 is a diagrammatic view showing the outcurving lines at the bow corresponding with the lines at which the bottom of the boat meets the surface of smooth water, and an arrow pointing to the surface receiving the weight of water on the port turn. Fig. 17 is a diagrammatic view showing the outcurving lines at the bow corresponding with the lines at which the bottom of the boat meets the surface of smooth water, and an arrow pointing to the surface receiving the weight of water on the starboard turn. Fig. 18 is a longitudinal sectional view showing two planing surfaces formed by a step in the hull.

Referring to the drawings, 1 are the side walls of the hull curving upwardly at the bow in sled form and meeting the deck 2, said side walls 1 tapering slightly toward the stern, and there meeting the transom 3. The said side walls converge slightly from the bow to the stern though almost parallel. The said bottom 4 constitutes the most distinct peculiarity of this hull, as it will be seen the keel 5 is from bow to stern, considerably above the chines 6, these distances being more greatly accentuated toward the bow. The keel 5 being above the chines 6 forms a hull of an inverted V type, with the angles of the V's broadening toward the stern, in fact continuously changing from bow to stern, being broad at the extreme bow and then narrowing to the narrowest form of the V at the greatest depth between keel and chines, and then broadening again until at the stern transom the angle of the V is at its broadest. The chines 6 at their forward ends terminate at the stem 23, this being horizontal instead of vertical as has been long established by custom. This stem extends from side wall to side wall at the extremity of the bow and where said side walls are preferably farthest apart, thus permitting a new construction for the bottom of the boat, which will enable the objects of the invention to be faithfully carried out. This forms a hull of the most peculiar form, which, combined with the peculiar method of driving and the peculiar method of steering, fulfils the requirements of motor driven boats, and particularly those designed for speed purposes, though it has great advantages as a cruiser or pleasure craft.
In Fig. 18 a modification of the hull is shown, in which 7 is a step in the length of the hull showing the application of this peculiar form of hull to the known form of biplane or monoplane hydroplane hulls, which are provided with step or steps forming two or more shelving surfaces. 8 and 9 are propellers mounted on the propeller shafts 10 and 11, the latter projecting from their engines 10ª and 11ª through the transom 3, one on each side of the center of the V-shaped bottom 4, forming twin propellers which in themselves are not a novelty, but with this type of bottom and with the new form of steering gear form a combination, as described more particularly hereinafter. As a further element of this combination, in Figs. 11 and 12, a new form of steering gear is shown, particularly applicable to this hull. This form of steering gear includes not only a new rudder arrangement having greater strength and reliability than the older systems but one offering less resistance to the water for the same proportionate steering effects than any other known rudder system, and one working in conjunction with the upwardly sloping shelving bottom surfaces. 12 and 13 are side plate rudders, preferably made of thin bronze or other suitable metal plate, and joined one to each side of the boat forward of the transom 3 by the hinges 14 and 15. These rudders are used one at a time on the side to which it is desired to steer the boat, being operated, not from the forward end through the rudder stock, but from the after end by being pushed from behind by a rack 16 actuated by a pinion 17, and traveling on the transom of the boat. The pinion 17 operating the rack 16, or push rod, is revolved in its turn by a shaft 18, passing inboard and along the keel of the boat, this making an extremely powerful, positive and reliable steering gear free from lost motion and doing away with rudder stocks, tillers, tiller lines, pulleys, and all deck gear. The hinges 14 and 15 are not perpendicular, but are inclined backward at the tops at an angle of 30° or more, causing the rudders to assume an inclined position when swung outboard in action with the lower edge forward, this in its turn causing the rudder to cut under in its movement through the water, and so lower the side of the boat on which it is operating, and thus bring into play the combined action between a shelving sloping surface of the bottom and the particular rudder used. 19 and 20 are hinged shelves secured to the hull over the transom 3, and adapted to fold outwardly, and to be supported on the struts 21 and 22. If the boat, for instance, is being steered to port, the port rudder alone is swung outboard, the lower edge is advanced, and besides from the ordinary steering section of the rudder, the port side of the boat is depressed. This in the case of any ordinary light hull, at speed, assists in stabilizing the boat on a rapid turn by "banking the turn"; but in the case of this type of hull a new and important action results. The depression of the port side of the hull brings the outcurving bottom surface of the port bow into action, causing the boat to swing rapidly to port, independent of the ordinary rudder action, and at the same time the sharp angle of the port bilge forward is thrown into the water, preventing the bow from skidding on the turn. In this way, through the aid of the side plate rudder, the most remarkable steering action that has yet been evolved in the development of the hydroplane is accomplished, enabling this type of boat to turn on a much shorter radius at full speed than any other hydroplane, and with complete safety.

The main difficulties in the past in using any of the conventional types of hydroplane to commercial advantage have been the following:

1. Low planing weight, 45 lbs. to the horsepower, including, of course, weight of hull, engine equipment, and crew, has been about the maximum at which these boats would work efficiently, necessitating the use of an especially light and strong and, therefore, expensive hull, together with a light and powerful motor, involving not only expense in this direction as well, but greater liability to breakdown.

2. Pounding in rough water; the construction of the hulls of planing type resulting in these boats pounding so severely in even moderately rough water as to be uncomfortable and in many cases dangerous.

3. Unseaworthiness under certain conditions of all earlier types of hydroplane boats, owing to the fact that the water lines, or lines of immersion forward, were without exception incurving toward a vertical stem, resulting in the boat's "tripping" or planing toward the opposite side to which the boat may be inclined, when driven at speed in a sea-way.

4. (Though this is of less importance) the older type of hydroplane with incurving water lines forward being wet or throwing water inboard in a sea-way at low or moderate speeds, and in some cases even at high speeds.

This type of hull was designed to obviate each of the above difficulties, and was as radical a departure from accepted practice as was the surface propeller.

Briefly, the main characteristics of the hull are as follows: The sides or topsides of the boat, instead of being drawn in toward the keel line at the bow, are continued forward practically holding their full width to the bow; the bow being wider than the stern. The bottom of the boat, instead of being of V'd, rounded or convex section, is of inverted V or concave section; the keel being higher than the angles of the bilge, with the depth of the inverted V section decreasing toward the stern. These inverted V bottom sections are so worked out toward the bow that the water lines, or lines of immersion forward, instead of being incurving toward the keel at the bow, are outcurving in relation to the keel going forward, no matter at what angle the boat may be inclined in relation to the surface of the water. These three characteristics, parallel topsides, coupled with inverted V bottom sections and outcurving water lines, are entirely novel principles as applied to hydroplane construction and operate in the following way, as relating to the four disadvantages referred to above in connection with the older types of hydroplane boat. The inverted V bottom sections of this boat, instead of throwing out at the sides the mass of spray—water and air—thrown out by the ordinary hydroplane, were designed to carry this water and air under the boat; thus assisting the boat in rising to the surface or planing.

1. By this simple device it has been demonstrated that these boats will run efficiently at weights of 70 lbs. to the horsepower, or above; as high as 80 lbs. to the horsepower having worked satisfactorily in contrast with the 45 lbs. of the ordinary hydroplane. This means that a heavier hull and a motor of more ordinary weight may be used and still leave a planing margin ample to carry a sufficient number of passengers to make the boat commercially a success.

2. The same feature of this type of hull that is responsible for the high planing weight is responsible for the practical elimination of the pounding; the second difficulty pointed out above in connection with the ordinary hydroplane, i. e., pounding in ordinary rough water. It has been finally demonstrated that it is not the angles of the inverted V sections which are responsible for this lack of pounding, but the air cushion which is carried under the boat by the novel form of hull. The boat may virtually be said to ride on compressed air. This absence of pounding in this hull, not only does away with the main danger of injury to the structure of the boat or the motor, but does away with the constant strain and stress felt by the passengers in traveling in other types of hydroplane in rough water.

3. Outcurving water lines forward in this type of boat have resulted in the elimination of the possibility of tripping, referred to above as the third great difficulty in the utilization of earlier hydroplane hulls. Instead of this type of hull planing to the opposite side to which the boat is inclined, this hull, owing to this inverted construction, must and does plane toward the side to which the boat is inclined; this feature acting as an automatic stabilizing device. So effective is this, that, not only does it prevent the boat capsizing in sea-ways in which boats of the same size, power and speed of other types could not be driven, but it carries this type of boat on practically an even keel, when run in any direction to the sea, even in comparatively rough water. While I realize that this is a very broad statement it has been fully borne out in practice.

4. This type of hull is drier, throws less water aboard at all speeds and in all conditions of water than does any other type. This is due partly to the fact that the topsides forward are not incurving, but are parallel; there being thus no "bluff of the bow" to raise water above the deck line; and partly to the fact that no spray is thrown out at the sides to be blown inboard aft "by a beam wind."

In the drawings Figs. 13, 14, 15, 16, and 17 illustrate the positions of the hull in operation, for it will be seen that in Fig. 13 where the hull is shown at rest, it looks very much the same as any other motor boat, with the exception of the sled-like bow, but on starting, see Fig. 14, the hull raises in the water, not like the customary hydroplane, that is to say, the bow does not shoot up into the air and sink the stern, thus producing a dragging effect to the whole, but rises evenly, naturally in view of the distribution of weights the bow portion of the boat will rise more buoyantly, though this will only give it a more easy position for the planing. After the hull has reached its speed position, it is bodily raised as shown diagrammatically in Fig. 15. In making the turn by the use of a side rudder, and in many cases by one of the surface propellers, which are used in this construction, the hull is banked up against a body of water, and then it is that the shape of the bottom co-acts with the rudder and the propeller in swinging the boat around on its turn. The banking effect is particularly illustrated in Figs. 16 and 17, which show for themselves by the arrows, how the bank of water in each case is up against the outcurving surface of the hull, which surface is bound to direct the turn so long as the propeller or the rudder, or both, maintain the shelving surface of the hull up against the bank of water. This will no doubt be now fully understood from the description herein without further explanation, as the drawings are made particularly explicit, in order that a clear understanding may be had in this invention.

It must be understood that the construction of the hull, the arrangement of the propellers and the specific construction of the rudders, may be changed to some extent without departing from the spirit of the invention, so long as they are kept within the scope of the claims for novelty following.

In Fig. 11 this boat is shown as driven by twin engines 10ª and 11ª, which are connected to the propeller shafts 10 and 11 thereby affording a means of maneuvering that is only possible with this type of boat. The surface propellers and the steering surfaces of the hull make it possible to approach a wharf or turn in a very small space, particularly when it is taken into consideration, that said steering surfaces may be operated in conjunction with said engines driven separately and together or with said twin rudders or with both.

What I claim is:

1. A motor boat comprising a hull formed of substantially parallel sides and a bottom divided into halves longitudinally of precisely similar dimensions, said halves having lateral upward inclinations from the chines and joined centrally forming two longitudinal continuous guiding surfaces in turning and twin surface propellers, each of said propellers coöperating with one of said guiding surfaces in steering the boat.

2. A hull in sled form having a stem extending athwartships and the chines curved upwardly at the bow end in the form of runners and its bottom divided into halves longitudinally of similar dimensions forming right and left sections and extending from the said stem to the stern and joined centrally above said chines throughout the length of the boat at a constantly changing angle most acute forward of midship.

3. A hull of the hydroplane type having a stem extending athwartships at the top of the bow extremities of the sides and the latter curving downwardly and continuing to the stern, the bottom edges of said sides being joined from stem to stern by corresponding bottom boards or plates inclined upwardly from said sides and joined centrally thereby forming lateral and longitudinal inclines of said bottom from bow to stern.

4. A hull of the hydroplane type and square bow having its sides substantially parallel and its bottom formed in similar halves meeting centrally at varying angles and joined, said sides and said bottom at their joining forming acute angles of varying measurements from bow to stern.

5. A boat comprising a hull having planing surfaces along the bottom thereof and rudder plates hinged obliquely, one on each side of the boat and extending slightly to the rear of the stern transom, and means for operating said rudder plates.

6. A boat comprising a hull having planing surfaces along the bottom thereof and rudder plates hinged obliquely, one on each side of the boat and extending slightly to the rear of the stern transom, a rack or push rod connecting with said plates, a pinion actuating said rack, and a shaft extending inboard and operatively connected with said pinion.

7. A hull having a stem athwartships and its sides extending from the outer ends of said stem in a substantially parallel direction to the stern and the bottom in corresponding halves joined centrally and forming an angle at the joint and sheering inwardly from the downwardly curved lines of chines and the straight continuation of said chines to said joint and insuring a gradual incline at the center of the bottom longitudinally from said stem to said stern.

8. In a motor boat, the combination with a pair of engines operating separately, a pair of propeller shafts extending rearwardly from said engines and propellers mounted at the ends of said shafts, of a hull having its bottom formed with port and starboard surfaces in horizontal section outcurving toward the bow, and twin rudders extending along the sides of the hull slightly beyond the stern transom and engaging the water obliquely in respect to the vertical line of the boat, and in conjunction with the corresponding engine, banking the opposite outcurving bow surface against the water in making a turn.

9. In a motor boat, in combination, a plurality of propellers and shafts operated separately, and a hull having its bottom sloping inwardly and laterally from the chines to a central joint, the latter in extension from stem to stern describing a curved downward incline and being at a greater distance from the chines intermediate of the length of the boat.

10. A motor boat comprising a hull in horizontal section showing the line of the central joint of an inverted V-shape type of bottom gradually lowering from stem to stern forming steering surfaces, means for driving said hull and means for steering the boat coöperating with one or the other of said surfaces in making the turn.

11. A motor boat comprising a hull having a stem athwartships at the top of upwardly curved sides and a bottom in halves sheering inwardly from the curved and straight portions of the chines to the center from each side and joined and twin rudders arranged to undercut into the water in operation and coact with the bottom surfaces respectively in making the turn.

12. A motor boat comprising a hull in horizontal section showing a bottom of inverted V-type and inclined downwardly from the stem throughout to the stern, the central joint of the bottom being at its greatest distance above the chines at the bow quarter, twin propellers actuated independently, each in conjunction with one of the bottom surfaces in making a turn, and twin rudders forming the means of initiating a turn and coöperating with the bottom and engine in making it.

13. A hull having a horizontal stem and its bottom boards secured at their bow end along said horizontal stem and sheering inwardly from stem to stern and the longitudinal central outer surface from stem to stern of the boat above the chines, said surface gradually inclining downwardly to its terminus at the stern transom.

14. A hull of inverted V-type bottom having the acute angles between the sides at the chines and the bottom pieces varying continually from stem to stern said bottom pieces at the bow joining a stem, the latter extending to each side of the center a distance substantially one half the width of the boat.

15. A hull having a stem extending laterally to each side of the longitudinal center line of the hull and joining the sides approximately on the same level as the fore deck, the longitudinal section of said hull through the center showing a downwardly curving outer surface from stem to stern.

16. A hull of inverted V-shaped bottom in cross section having the halves forming said bottom extending from the chines and an athwartships stem to a broad V at the stern and shaping the bow surfaces to coöperate in making a turn.

17. A hull having its bottom in longitudinal halves extending inwardly in upward inclines and sternwardly in downward inclines from a horizontal stem and the chines, a pair of rudders and twin surface propellers the port rudder coöperating with the starboard propeller and the starboard rudder coöperating with the port propeller in turning movements.

18. A motor boat comprising a hull having bow steering surfaces on the bottom formed by the fore and aft and lateral inclines of the halves of the bottom directly from a horizontal stem, a pair of surface propellers independently operated, and a pair of side plate rudders, each rudder coöperating with the steering surface on its own side and the propeller on the opposite side.

19. A hull having its bottom divided in longitudinal halves secured along a horizontal stem, sheering inwardly between stem and stern and joined centrally, said joining being above the chines from the stern forward in the submerged portion of the hull at speed and extending from said stern in an upwardly inclined direction toward the bow.

20. A hull having the fore part of its bottom in halves secured along a horizontal stem and joined centrally and extending downwardly from a stem athwartships and from slightly forward of midships forming outcurving surface, said bottom halves continuing in their downward incline to the stern of the boat.

21. A motor boat comprising a hull having its bottom rising toward the center from the chines to form outcurving upwardly sheering surfaces at the bow terminating at the extreme ends in a horizontal stem, twin rudders operating from the sides at the stern portion, twin propellers and twin engines driving said propellers respectively and adapted to coact with said steering surfaces with or without the aid of said rudders in maneuvering the boat.

Signed at Boston, Massachusetts, U. S. A., this seventh day of January A. D. 1914.

WILLIAM ALBERT HICKMAN.

Witnesses:
 GEORGE L. DILLOWAY,
 JULIA W. TROY.